June 24, 1952
O. THANING
2,601,421
METHOD OF SHELLING NUTS
Filed June 3, 1949
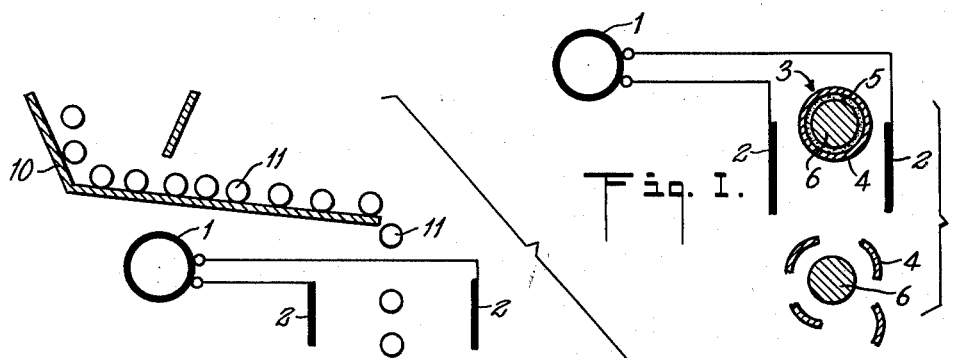
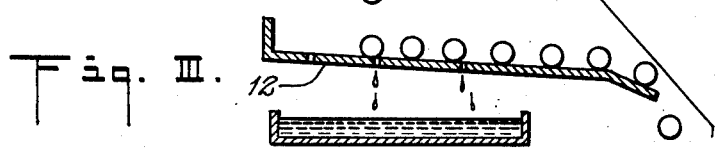
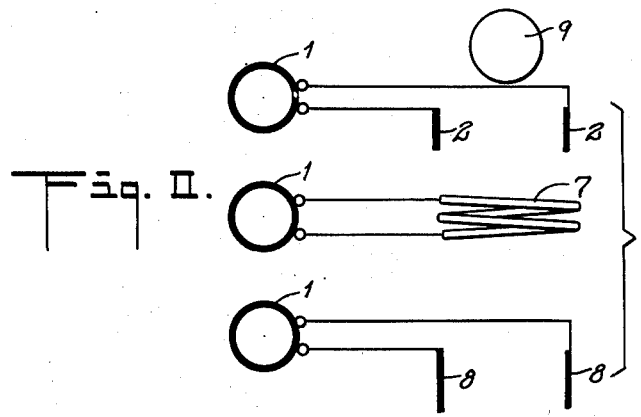
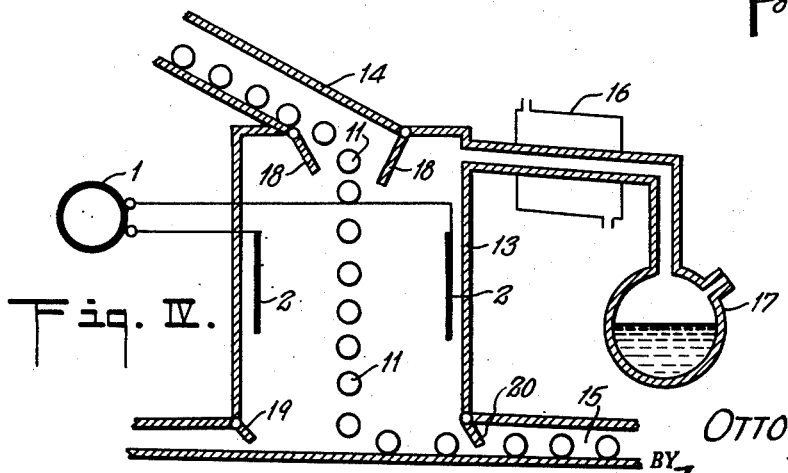
INVENTOR.
OTTO THANING
BY Francis O. Boyce
ATTORNEY Patented June 24, 1952

2,601,421

UNITED STATES PATENT OFFICE 2,601,421

METHOD OF SHELLING NUTS

Otto Thaning, Eikenhof, Transvaal,
Union of South Africa

Application June 3, 1949, Serial No. 96,884
In the Union of South Africa July 19, 1948

3 Claims. (Cl. 146—227)

This invention relates to a method of treating substances or objects such as nuts, seeds, fruits or roots for the removal of shells, hulls, liquids and oils and without the use of mechanical forces so that the unwanted portions thereof are removed and their desired constituents are separated and recovered.

According to this invention the material or objects are subjected to the effects of electrostatic or electromagnetic fields of regulated frequency and intensity by means of which heat is produced in the specific zones of the objects so as to vaporize their contents, causing them to explode, disengage their shells, hulls or the like and sweat out and/or vaporize the oils.

This method of treatment avoids the mechanical breakage of the objects or material. For example certain nuts consist of a comparatively hard dry shell with an underlying layer containing appreciable quantities of liquid matters surrounding the nut kernel or meat. According to the methods hitherto used the latter is extracted by cutting or cracking the hard shell by purely mechanical means which is very cumbersome and results in considerable wastage as a large percentage of the nut kernels break and thus are reduced in value. This is overcome by the present invention whereby the nut is placed in a high-frequency electric field, the intensity, frequency, shape and extension of which is chosen so that adequate heat is created in the moisture containing layer under the shell, to cause it to evaporate suddenly thereby bursting and removing the shell and leaving the nut kernel or meat intact.

Again for example the nuts, seeds, fruits and roots have in the past been broken and pressed to extract their oil content and the meat in such cases is left as a meal.

The accompanying drawings illustrate diagrammatically methods for carrying out the invention in which—

Fig. I illustrates a basic method of operation,

Fig. II is an elaboration of Fig. I, and

Figs. III and IV illustrate stages in the treatment process.

In the drawings I illustrates a source of high frequency electrical energy connected to metallic plates 2. In Fig. I, 3 shows a nut having a shell 4, a liquid or semi-liquid layer 5 and a kernel or meat 6. The nut 3 is made to pass by gravity or otherwise through the high-frequency electric field between the plates 2 and during such passage the heat generated in layer 5 is sufficient to vaporize the liquid resulting in the bursting of the shell 4 which not infrequently may fly off from the kernel 6 with some force, as shown in Fig. I, leaving the latter intact.

As an example the apparatus illustrated in Fig. I was used to remove the shells from hazel nuts. In this case the plates 2 were positioned 50 millimetres apart and a one kilowatt transmitter I oscillating at between 15 and 20 megacycles was used. It was found that the shells burst off from the kernels very rapidly when the nuts were placed between the plates except in the case of nuts which had worm holes in them. In the latter case the vaporized liquid merely discharged through the holes so that there was a selective action in the shelling of the nuts.

In certain cases the desired result may be attained by adjusting the frequency and intensity of the electrostatic or electromagnetic fields through which the objects to be treated are passed in such a manner that heat and the resulting forces are mainly created in the outer portion or in the inner portion or by variation of the fields so that the heat or forces are first created mainly in the outer and subsequently mainly in the inner portion or else in any intermediate layers of the objects.

This may be attained by a corresponding variation of the field in question or else by passing the object through a series of different fields, as for example, illustrated in Fig. II where 2, 7 and 8 represent different plates or coils connected to high frequency supplies I of different intensities and frequencies. The object 9 falls by gravity or otherwise moves through the fields created between the plates or coils 2, 7, 8. Assuming that a very high frequency supply is connected to 2, a medium high frequency supply to 7, and a high frequency supply to 8, and the time the object 9 is subjected to the effects of each of the fields in question is adjusted accordingly and the shape and size of the plate and/or coils is suitably chosen, the following effects may, for example, be attained:

On passing through 2 heat is created mainly in the surface layer and the outer shell or rind of the object 9 which is thereby dried and hardened.

On passing through 7 the inner core of 9 is mainly heated up and its contents of moisture or oil driven out toward the outer hardened shell or rind.

On passing through 8 the liquid or oil accumulated under the hardened shell or rind is caused to expand or vaporize suddenly thus bursting the shell or rind.

By treating the object with chemicals or causing metallic deposits to be made in or on the object by metallic spraying, electroplating or the like before passing through the field the effect can be suitably influenced.

The method is adaptable to a great number of different uses such as removal of shells or other parts of fruits, nuts, roots or plants, or the extraction of liquids or oils from them.

Fig. III shows a chute 10 for regulating the supply of objects 11 to be treated. In this case they may be the kernels of nuts which have passed through the process shown in Figs. I or II. After passing through the heating zone, for example between the metallic plates 2, they are collected in some apparatus illustrated by the sieve 12 for the removal of oils or other liquid made available or expelled during the course of the treatment.

The plates or coils 2 may be arranged in closed vessels or in tubes where the liquids or oils are collected or precipitated by condensation as illustrated by Fig. IV. In Fig. IV, 2 represents the plates or coils connected to the high frequency supply 1 and contained in vessel 13 through which the objects 11 are being passed. They are admitted through the feeding chute 14 and after treatment they leave through the outlet chute 15. Said objects 11 may have been discharged from the process illustrated in Figs. I, II or III or they may be untreated material. 18, 19, 20 illustrate valves or traps for regulating the passage of material therethrough. An air, gas or solvent supply of higher or lower than atmospheric pressure may pass through the vessel 13 and carry liquids, oils or gases expelled or vaporized from objects 11 through, if necessary, a cooler or condenser 16 to a storage and separation vessel 17.

This invention provides a method for the treatment of materials or objects whereby without mechanical forces shells and/or hulls are removed and their valuable liquid contents separated and recovered.

What I claim as new and desire to secure by Letters Patent is:

1. A method for removing the shells from the kernels of nuts without damage to the latter, comprising the steps of allowing the nuts to fall by gravity between plates through an electrostatic field of high frequencies between said plates to vapourize the liquid within the shells to generate an explosive pressure to burst the shell from the kernel.

2. A method for removing the shells from the kernels of nuts without damage to the latter, comprising the steps of allowing the nuts to fall by gravity through successive fields of high frequency electric currents by which the shell is case hardened, the moisture in the kernel driven to the inside of the shell and finally vapourized with the liquid within the shells to generate an explosive pressure to burst the shell from the kernel.

3. A method for removing the shells from the kernels of nuts without damage to the latter, comprising the steps of metallically coating the shells, passing the nuts through electromagnetic fields of high frequency to heat and vapourize the liquid in the nut thereby producing pressure to explode the shell from the kernel.

OTTO THANING.

REFERENCES CITED

The following references are of record in the file of this patent:

UNITED STATES PATENTS

| Number | Name | Date |
|---|---|---|
| 1,250,140 | Chapman | Dec. 18, 1917 |
| 2,006,265 | Davis | June 25, 1935 |
| 2,248,368 | Low | July 8, 1941 |
| 2,318,265 | Stegmeier | May 4, 1943 |
| 2,390,277 | Simpkins | Dec. 4, 1945 |
| 2,446,202 | Vang | Aug. 3, 1948 |

FOREIGN PATENTS

| Number | Country | Date |
|---|---|---|
| 469,425 | Great Britain | July 26, 1937 |

OTHER REFERENCES

Electronics Brightest Star, published in Scientific American, September 1943, pages 103 to 105.